Oct. 14, 1930.  K. A. HAWLEY  1,778,152
MULTIPLE SKIRT SUSPENSION INSULATOR
Filed Aug. 9, 1924
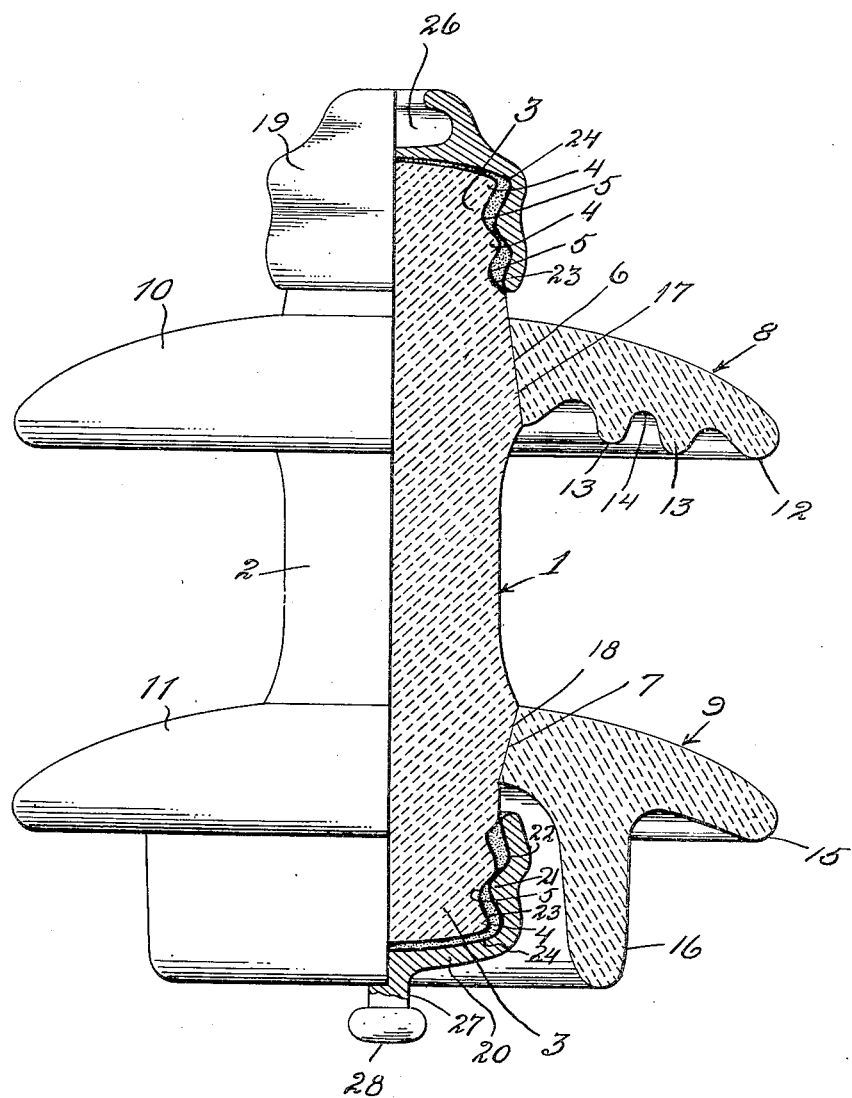
Inventor
Kent A. Hawley
By _____
his Attorney Patented Oct. 14, 1930

1,778,152

UNITED STATES PATENT OFFICE

KENT A. HAWLEY, OF VICTOR, NEW YORK, ASSIGNOR TO LOCKE INSULATOR CORPORATION, OF BALTIMORE, MARYLAND, A CORPORATION OF MARYLAND

MULTIPLE-SKIRT SUSPENSION INSULATOR

Application filed August 9, 1924. Serial No. 731,169.

The invention relates to strain insulators adapted for use in connection with high tension lines.

The primary object of the invention, generally stated, is the provision of a multiple skirt suspension insulator having structural characteristics whereby the leakage path and puncture distance will be as great as is practicable in order to obviate any probability, or even possibility, of short circuiting, with the current losses and other disadvantages attendant thereupon.

Another object of the invention, more particularly stated, is the provision of a suitable multiple skirt insulator in which the stem or body and the skirts are made separately, with the latter subsequently mounted upon the former, the parts being so treated initially and after assembling as to insure a permanent union of the skirts with the body and to accomplish the effect of integrality but in such a manner as to preclude likelihood of producing stresses or strains which might cause fracture during the process of manufacture, or later when the insulator is in actual service.

To the attainment of the foregoing and other objects and advantages, the invention consists in the details of construction and arrangement of parts to be hereinafter more fully described and claimed and illustrated in the accompanying drawings, it being, however, understood that various changes and modifications may be made to increase the adaptability and widen the field of utility of the device, provided such variations constitute no departure from the spirit of the invention or the scope of the claims hereto appended.

In the drawing, the figure is a view of an insulator constructed in accordance with my invention, one half being in elevation and the other half in longitudinal section.

Referring to the drawing in detail, the numeral 1 designates the stem or body which is molded or otherwise formed of porcelain or other suitable insulating material, and which preferably has a slightly constricted central portion 2 and substantially similar end portions 3 formed with alternate peripheral ribs and grooves 4 and 5, respectively. Between the central portion 2 and the peripherally corrugated or ribbed and grooved ends 3, the body has portions of its periphery tapered, as indicated at 6 and 7, for a purpose to be described, these tapered portions decreasing in diameter toward the ends of the body.

In connection with the above described main portion, stem or body, I make use of skirts 8 and 9 which have convex upper surfaces 10 and 11, respectively, as is customary, in order to shed water and to lessen any likelihood of the accumulation of dust or other foreign matter thereon. The skirt 8 is so formed as to provide a peripheral flange 12 acting as a drip, and in the present instance the under surface is represented as formed with alternate circular or annular ribs and grooves 13 and 14 which are provided for the purpose of increasing the area or the current leakage path.

The skirt 9 has its underside dished, recessed or otherwise formed to define a drip flange 15, and at an intermediate point it is provided with a depending sub-skirt or flange 16 which increases the area and which has another function to be explained hereinafter. The skirts are formed with central holes 17 and 18, respectively, which are tapered in shape and of such diameter as to be engaged upon the tapered portions 6 and 7 of the body.

In the actual manufacture, the body is formed as indicated above and the green porcelain of the skirts and body is then coated with glaze, the skirts placed in position, and the entire insulator so formed is fired, causing the skirt portions to shrink and to tightly bind the body portion, the interposed glaze fusing so that the entire insulator is in fact a single unit.

The suspension or terminal means might be varied considerably, though I have shown caps 19 and 20 which are metallic and which have their inner walls formed with alternate ribs and grooves 21 and 22, respectively, corresponding substantially to the ribs and grooves 4 and 5 at the ends of the body but preferably staggered in relation thereto. The ends of the body may, if preferred, be coated with asphalt or other suitable elastic material, to provide a coating 23 covering the corrugated or ribbed and grooved ends and the caps may also be similarly treated to provide a coating 24 therein. The caps are applied to the ends of the body and held thereto by suitable cementitious material indicated at 25, which material is ordinarily placed within the caps, subsequently to which they are pressed onto the ends of the body, the cement filling the grooves and the surplus oozing out at the open ends of the caps and being removed. If desired, the terminal elements might be embedded within or recessed into the ends of the body without departing from the scope of the invention.

In the present instance the cap 19 is shown as having a socket 26 while the cap 20 carries a stem 27 terminating in a head 28. By this arrangement it is evident that a plurality or series of the insulators may be strung together or connected, the stem 27 and head 28 of one being engaged within the socket 26 of another in an obvious manner. The sub-skirt or flange 16 surrounds the cap 20 so that only a portion of the stem 27 and the head 28 will project therebelow. One advantage of this feature is that the connection between two of the insulators will be practically housed and water, snow and dirt excluded.

A feature of great importance is that the flange 16 serves as a firing foot for the entire insulator, the lower edge being the point or area of rest. The weight of the body 1 and skirt 8 will cause a firm and close contact at the tapered seat 7 and the weight of the skirt 8 alone causing it to engage properly at the tapered seat 6, thus insuring that the joints will be thoroughly fused.

From the foregoing description and an inspection of the drawing it is obvious that the plurality of skirts will greatly increase the leakage distance between the terminals or caps. It is also to be noted that the caps are separated by nearly the full length of the body, thus giving practically the maximum puncture distance. These features are of prime importance in a strain insulator used in connection with high tension lines.

While the insulator is shown and described as having two skirts, it is a contemplated possibility that it could be provided with more or constructed with only one, such variations or modifications being covered by the claims and being desirable in some instances, depending upon the type of insulator and the specific manner of employment.

Having now described my invention, what I claim as new and desire to secure by Letters Patent, is:

1. An insulator comprising a body of vitreous material formed with outwardly tapering seat portions spaced from its ends, and a plurality of skirts adapted to be engaged upon and united with said seat portions.

2. In an insulator, a body of vitreous material having oppositely tapered seats, and skirts adapted to be engaged upon the body at the seats whereby to be fused thereto, one skirt serving as a firing foot, the weight of the other skirt engaging it firmly upon its seat and the weight of the body and the second named skirt causing firm engagement of the tapered portion constituting the seat for the first named skirt.

In testimony whereof I affix my signature.

KENT A. HAWLEY.